United States Patent

Derckx

[11] Patent Number: 5,240,401
[45] Date of Patent: Aug. 31, 1993

[54] CANDY-MOLDING MACHINE

[76] Inventor: Hendricus A. J. M. Derckx, De Fuus 8, 6006 RV Weert, Netherlands

[21] Appl. No.: 837,066

[22] Filed: Feb. 14, 1992

[30] Foreign Application Priority Data

Mar. 1, 1991 [NL] Netherlands .......................... 91-00383

[51] Int. Cl.⁵ .............................................. B29C 31/08
[52] U.S. Cl. ..................... 425/517; 425/126.2; 425/298; 425/305.1; 425/345; 425/348 R; 425/352
[58] Field of Search ................. 264/163; 425/126.2, 425/297, 298, 305.1, 345, 348 R, 350, 394, 409, 410, DIG. 5, 352, 517, 520

[56] References Cited

U.S. PATENT DOCUMENTS

| | | | |
|---|---|---|---|
| 1,272,073 | 7/1918 | Majewski | 425/350 |
| 1,689,879 | 10/1928 | Krout | 425/126.2 |
| 1,958,380 | 5/1934 | Bottger et al. | 425/126.2 |
| 3,014,240 | 12/1961 | Burt | 425/350 |
| 3,285,199 | 11/1966 | Waite et al. | 425/126.2 |
| 3,541,973 | 11/1970 | Aquarius | 425/126.2 |
| 3,879,162 | 4/1975 | Aquarius | 425/126.2 |
| 4,556,379 | 12/1985 | Ikishima | 425/297 |

FOREIGN PATENT DOCUMENTS 10597 of 1913 United Kingdom ................ 425/348

*Primary Examiner*—Scott Bushey
*Attorney, Agent, or Firm*—Ladas & Parry

[57] ABSTRACT

A machine for producing lollipops 3 having a rotatable die ring 6 with radial press rooms 11 into which cut sugar pieces 1 are fed from inside the die ring and from which the completed lollipops 3 are discharged outwardly, with assistance of centrifugal force. Pivotal flaps 16 are provided to prevent escape of the cut sugar pieces from the cavities of movable shear blades 7 after the cut sugar pieces have been successively fed into the cavities.

11 Claims, 3 Drawing Sheets

CANDY-MOLDING MACHINE

FIELD OF THE INVENTION

The invention relates to a machine for producing candy from a mass of sugar bar or similar material consisting of a supply means for intermittingly supplying a bar of material, a shearing device for shearing the supplied bar of material, and a die-member having a plurality of press rooms and corresponding pressing stamps for molding the candy.

BACKGROUND AND PRIOR ART

Such a machine is known from U.S. Pat. No. 1,785,904. In this known machine the bar of material is fed to a shearing device consisting of a stationary plate having a radial inlet for the material, and a blade which may transfer the cut material to an axial die-cavity of a die-disc in which the material is processed further. In a shearing device operating in this manner the material may, depending on the speed of rotation of the die-disc, either be ejected by the centrifugal force or may on the contrary be stuck to the blade, so that the machine has to be stopped to correct the undesired situation.

SUMMARY OF THE INVENTION

The invention aims at improving the foregoing. According to the invention this is in principle attained, in that the die-member is a die-ring having radial press rooms, and in that said shearing device consists of a fixed blade in a stationary position between the supply means and the die-ring, and shear-blades positioned inside the die-ring in front of each press room and having a shape adapted to the shape of the press rooms, so that said pressing stamps inside the die-ring may pass into said rooms.

The shearing edges of the shear-blades preferably are each positioned at the trailing edge of the associated press room. This is effected, because otherwise the shearing edge would deteriorate too rapidly.

In order to prevent the material from leaving the shaped shear-blades a flap is provided inside the die-ring opposite each shear-blade, said flap having a cross-section adapted to the shape of the press rooms, and being rotatable about a center of rotation in such a way that its cross-section during shearing the bar of material substantially coincides with the edge of the press room being positioned opposite the edge cooperating with the shear-blade.

Each pressing stamp inside the die-ring, also called lower stamp, is mounted on the extremity of a rod which is provided at its opposite extremity with a central pressing roll and an external return roll, said rolls controlling the movements of the stamps connected therewith.

Each outer stamp is mounted on a pivotable lid which only needs to be open when the candy is discharged.

A means may be employed to provide the candy with a stick before it is discharged from the machine.

BRIEF DESCRIPTION OF THE DRAWING

The invention will be further described hereinafter on the basis of the drawing illustrating by way of example, a machine for making lollipops. In the drawing.

DETAILED DESCRIPTION OF PREFERRED EMBODIMENTS

Figure 1:
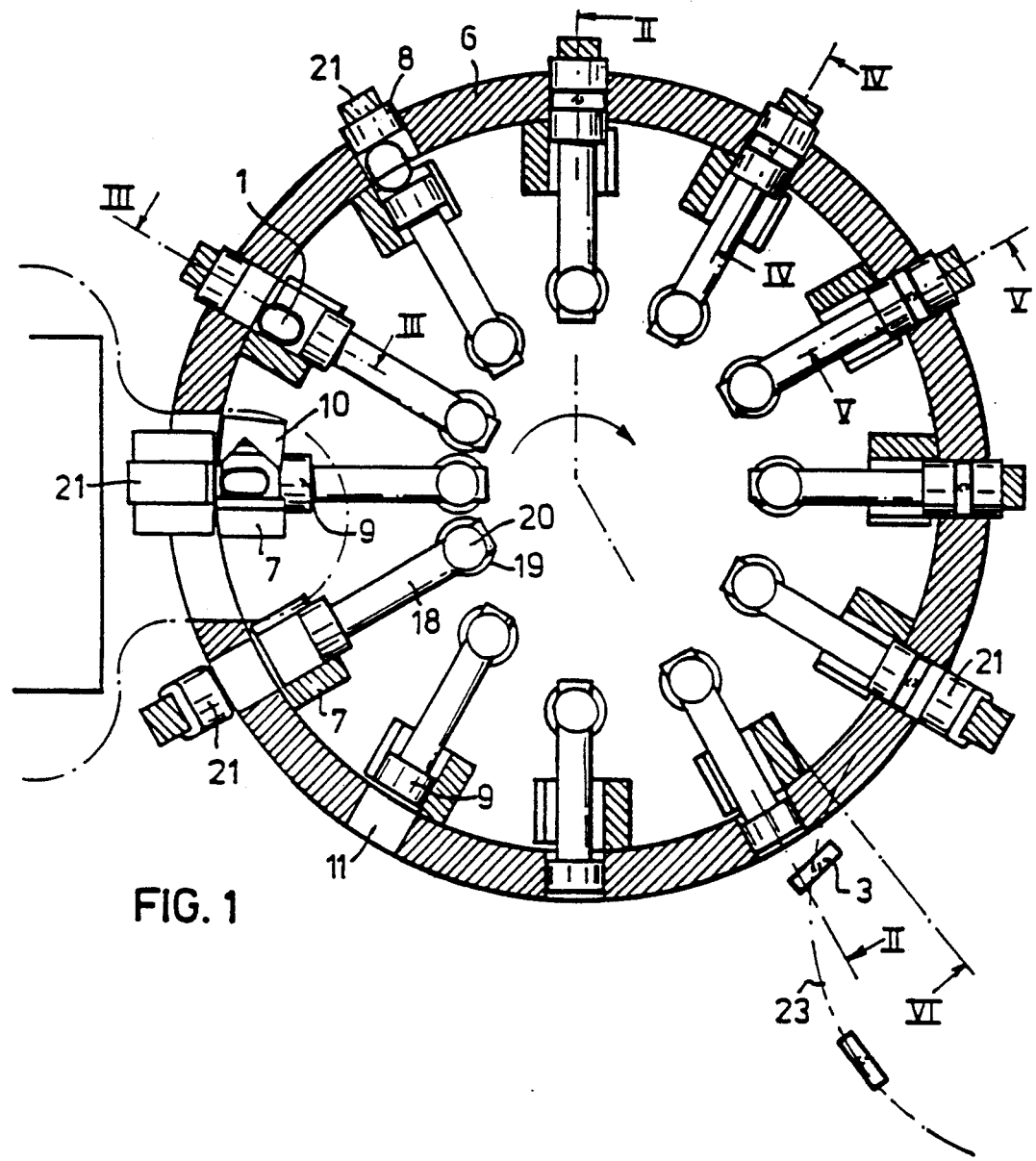
FIG. 1 shows, in section, a schematic side view of the die-ring for tongue-shaped lollipops and a supply means at right angles thereto.

The machine which is schematically indicated in the drawing is used for shearing pieces of sugar 1 from a sugar bar 2, which pieces of sugar are subsequently compressed to form a confectionery lollipop 3. The machine substantially consists of a supply means which is provided with two forward rollers 4 and 5, a rotatable die-ring 6 having shear-blades 7 and pairs of inner and outer stamps 9 and 8 respectively.

A fixed blade 10 is mounted between the forward rollers 4 and 5 and the perimeter of the path which is described by the shear-blades 7 within the die-ring 6. These shear-blades 7 have a shape adapted to the shape of press rooms 11 provided in ring 6, in which the pressing stamps 8 and 9 can move in such a manner that the lower stamps 9 pass the shear-blades 7. In the example shown in FIGS. 1 and 2 twelve shear-blades 7 having a tongue-shaped cavity are mounted on the die-ring 6 so that the lower stamps 9 travel therepast. A stick 12 can be inserted in a manner not specified further in order to complete the lollipop.

Figure 2:
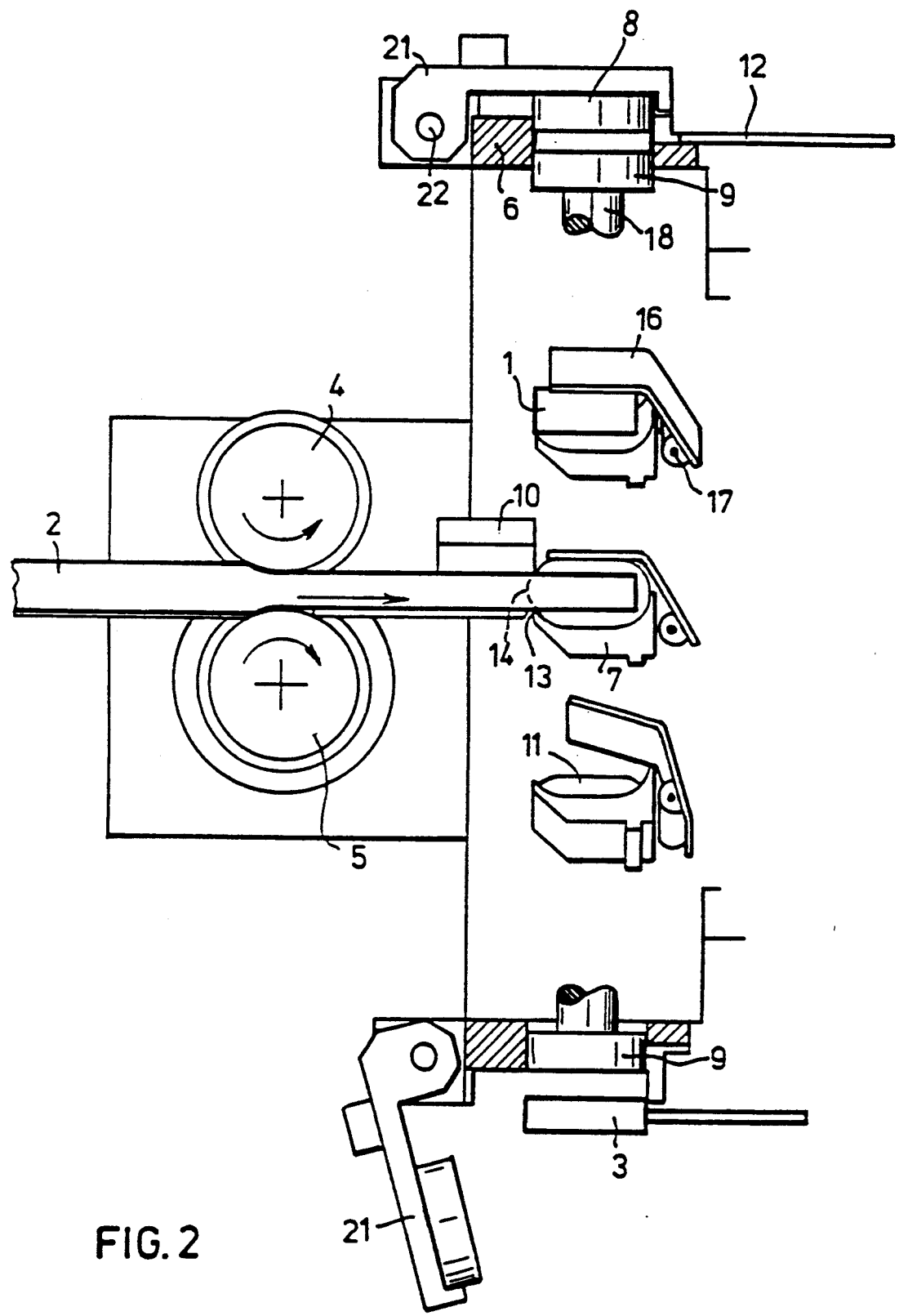
FIG. 2 is a schematic view of the die-ring as seen on broken line II—II in FIG. 1.
Figure 3:
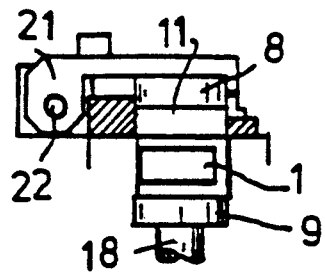
FIGS. 3 to 6 show cross-sections on a smaller scale taken along lines III—III to VI—VI in FIG. 1 so as to elucidate various stages of the lollipop-making process.
Figure 4:
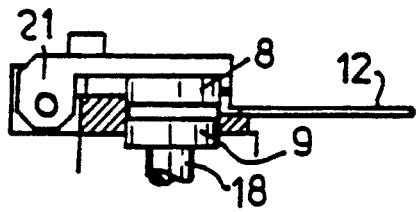
Figure 5:
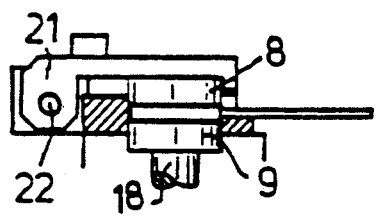
Figure 7:
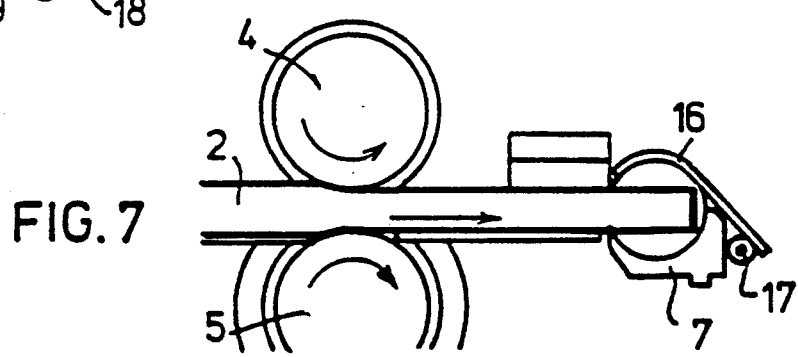
FIGS. 7 and 8 show on the same scale as FIGS. 1 and 2 two alternatives of the machine for making round and oval lollipops, respectively.
Figure 8:
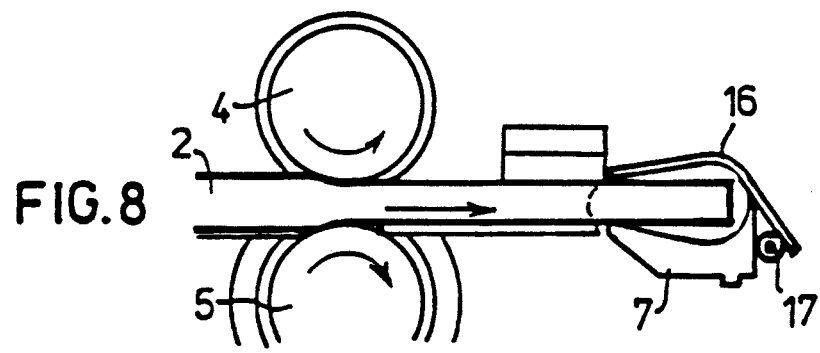

From FIG. 2 it appears that the shearing edge 13 of each of the shear-blades 7 is at the rear side with respect to the end 14 of the press room closest to the supply means 4, 5. This is necessary with this embodiment, otherwise the point would become too sharp. However, there also are many other possible profiles of the press rooms and corresponding pressing stamps, and thus of shear-blades 7; FIG. 7 show a shear blade shape for producing so-called "round" lollipops, and FIG. 8 for producing "oval" lollipops.

The forward rollers 4 and 5 turn intermittingly round in the rotation direction of the arrows. The parts 7 and 10 are shown as the shear blades of the sugar-strand-shearing-device. As soon as shear-blade 7 has rotated past the horizontal center line of FIG. 1 over an angle of several degrees, and thereby shearing off a piece 1 of the sugar bar 2, the forward rolls 4 and 5 move the sugar bar 2 in a direction perpendicular to the direction of rotation of said rolls. This forward movement is stopped before the next shear-blade 7 can cut off a sugar piece 1 from the sugar bar 2. Cutting off a sugar piece from the sugar bar takes place between the moving shear-blades 7 and the fixed blade 10.

In order to prevent the cut sugar piece 1 from being ejected from the cavity in blade 7, a flap 16 is provided over blade 7. Just like the shear-blade 7 this flap 16 has a cross-section corresponding with the pres rooms 11. The flap 16 can rotate about a center of rotation 17 and is usually "open", except, of course, during the time the sugar bar 2 is cut off.

The sugar piece 1 cut off from the sugar bar 2 is picked up by the shear-blade 7 and the flap 16 prevents it from escaping. By virtue of the movements of the pressing stamps 8, 9 the sugar piece 1 is subsequently pressed to the desired lollipop shape 3.

The lower stamps 9 are each mounted on a rod 18 which at its other end is provided with a pressure roll 19 which applied a force to rod 18 and thereby to the lower stamp 9 to apply compression to the sugar piece in the press room. A return roll 20 positioned outside the rod 18 serves for returning the rod to its initial position. The means for controlling the rolls 19 and 20 have for clarity's sake been omitted in the drawing.

The upper stamps 8 are each mounted on a lid 21 which can pivot on ring 6 about a center of rotation 22. The five lower lids 21 are open in FIG. 1. As a result a completed lollipop 3 can be removed on to a removing disc 23 which in FIG. 1 is schematically indicated by a dot and dash circle. In the bent part a lid 21 can be seen also.

The lids 21 are closed at those areas where necessary for the production process by a solid guide member, not shown.

The lollipop 3 obtains the shape of the press room 11 which is formed by the side walls of the press room in ring 6 and the heads of the stamps 8 and 9. During the rotary movement of the die-ring 6 the stick 12 of the lollipop is also fed to the die-ring 6 in axial direction so as to be inserted into the lollipop.

Figure 6:
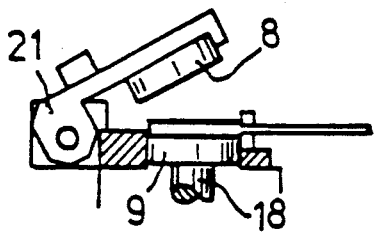

Once the lollipop 3 is completed, the stamps 8 and 9 move into the position shown in FIG. 6 to bring the lollipop outside the press room.

For completeness' sake it is noted that the candy to be produced by the invented machine may have all possible cross-sections, including a square cross-section.

Also other embodiments fall within the scope of the invention than the one discussed above and/or indicated in the drawing.

What is claimed is:

1. A machine for producing candy from a sugar bar comprising:
    a rotatable die ring having an axis of rotation and circumferentially spaced press rooms extending radially therethrough, said press rooms having a determined cross-sectional shape;
    supply means for intermittently feeding a sugar bar along a path of travel in a direction parallel to the axis of rotation of the die ring at a location radially inwards of said die ring;
    a fixed shear blade located adjacent to the path of travel of the sugar bar in proximity to said die ring;
    a plurality of movable shear blades carried by said die ring adjacent to each press room for movement with said die ring in succession past said fixed shear blade to successively cut off pieces of said sugar bar and transport the cut pieces of sugar bar with said movable shear blades;
    said movable shear blades being shaped to provide a cavity which corresponds to the shape of the press rooms;
    outer pressing stamps carried by said die ring at each press room; and
    inner pressing stamps carried by said die ring for radial displacement within the movable shear blades to displace the cut pieces of sugar bar therefrom into the press rooms and compress the pieces of sugar bar against the outer pressing stamps.

2. A machine according to claim 1, wherein said die ring has inner and outer surfaces, said movable shear blades being carried adjacent to said inner surface of the die ring.

3. A machine according to claim 2, wherein each movable shear blade has a shearing edge located at a rear end of the respective press room, which is closest to said supply means, when said respective press room is adjacent to said fixed shear blade.

4. A machine according to claim 1, comprising a pivotal flap on each movable shear blade to cover the cavity in said movable shear blade and prevent escape of the cut piece of sugar bar therein.

5. A machine according to claim 10, wherein said flap has a shape which corresponds to the shape of the press room.

6. A machine according to claim 1, comprising a radial rod carrying each inner press stamp, said radial rod having an inner end provided with a press roll and an external return roll, said press roll and return roll controlling radial movements of said radial rod and said inner pressing stamp.

7. A machine according to claim 1, comprising a pivotal lid on said die ring carrying a respective one of said outer pressing stamps, said pivotal lid having an open position in which a compressed piece of sugar bar is removable from the associated press room.

8. A machine according to claim 1, comprising a means for supplying a stick to each press room so that the piece of sugar bar in the press room is compressed on said stick.

9. A machine according to claim 1, wherein said fixed shear blade has a shearing edge disposed within said die ring and said movable shear blades have respective cutting edges which travel past the shearing edge of the fixed shear blade as said die ring rotates.

10. A machine according to claim 9, wherein said shearing edges of said movable shear blades are located at an end of each said press room which is closest to said shearing edge of the fixed blade.

11. A machine according to claim 10, wherein said supply means comprises rollers for feeding the sugar bar past said fixed blade, then past said shearing edges of the movable blades and into the cavities formed by said movable blades.

* * * * *